Figures 1, 2:
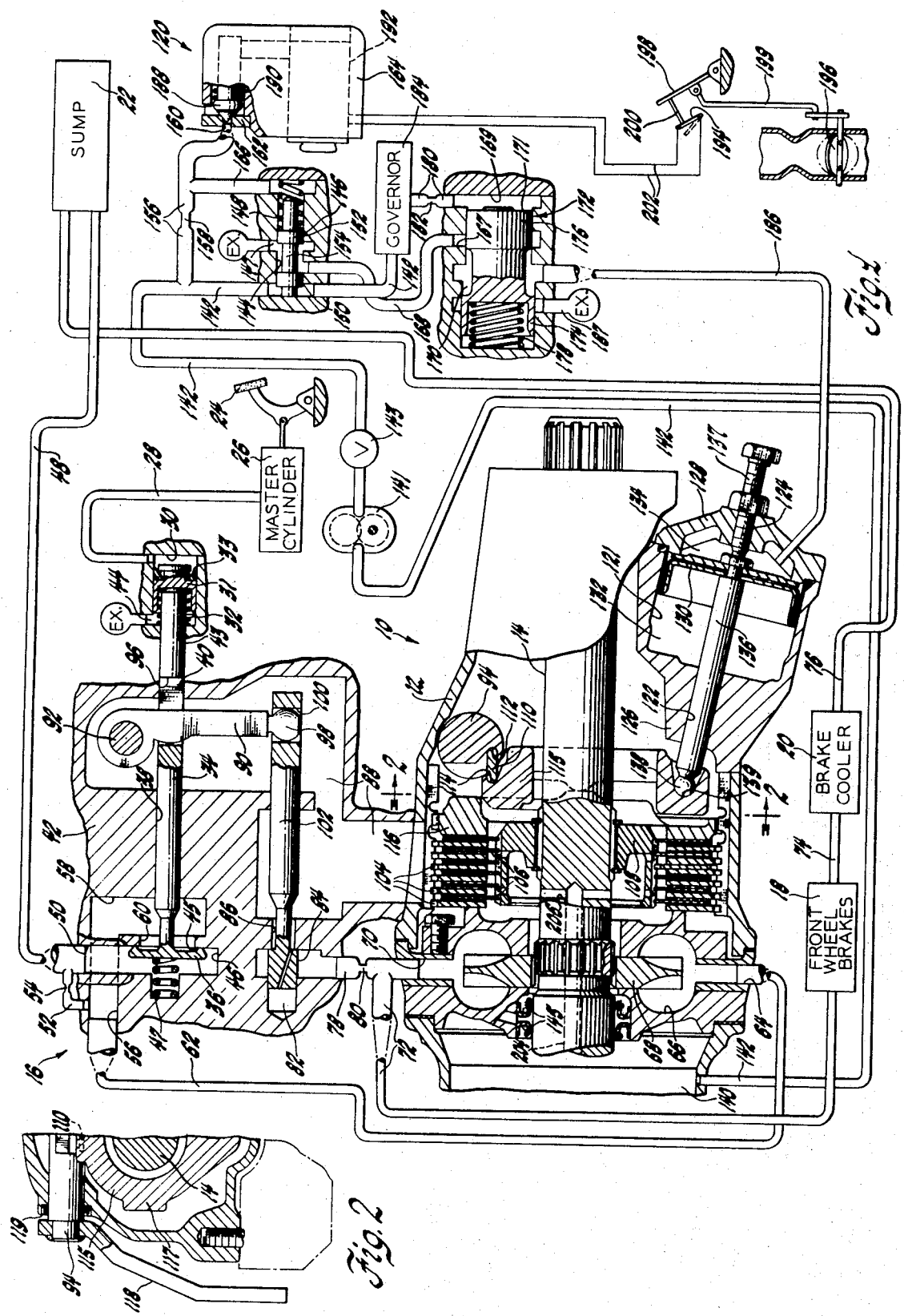

United States Patent [19]
Koivunen

[11] 3,771,630
[45] Nov. 13, 1973

[54] ANTI-CREEP BRAKE CONTROLLED BY THROTTLE AND VEHICLE SPEED

[75] Inventor: Erkki Koivunen, Livonia, Mich.

[73] Assignee: General Motors Corporation, Detroit, Mich.

[22] Filed: May 26, 1972

[21] Appl. No.: 257,438

Related U.S. Application Data

[62] Division of Ser. No. 114,601, Feb. 11, 1971, Pat. No. 3,696,893.

[52] U.S. Cl. ............... 192/3 TR, 192/4 A, 188/72.6
[51] Int. Cl. ............................................ B60k 29/00
[58] Field of Search.................. 192/3 R, 3 TR, 4 A; 188/72.6, 369

[56] References Cited
UNITED STATES PATENTS

| | | |
|---|---|---|
| 2,926,737 | 3/1960 | Fischer .......................... 192/3 TR |
| 2,726,556 | 12/1955 | Greenlee ......................... 192/4 A X |
| 2,630,196 | 3/1953 | Weiss et al ...................... 192/4 A X |
| 2,843,235 | 7/1958 | Weaver............................. 192/3 TR |
| 3,110,478 | 11/1963 | Qualman............................ 192/3 R |

Primary Examiner—Benjamin W. Wyche
Attorney—Warren E. Finken et al.

[57] ABSTRACT

A brake-engaging system including brake discs mounted in part on a transmission output shaft and in part on the transmission housing for stopping the rotation of the output shaft in response to the combination of a fluid pressure signal indicative of a substantially zero throttle plate opening and a substantially zero vehicle speed.

6 Claims, 2 Drawing Figures

ANTI-CREEP BRAKE CONTROLLED BY THROTTLE AND VEHICLE SPEED

This is a division of United States patent application Ser. No. 114,601, filed Feb. 11, 1971 and now U.S. Pat. No. 3,696,893.

This invention relates generally to brake systems for motor vehicles and, more particularly, to a transmission output shaft-controlled brake system.

An object of the invention is to provide a brake-engaging system, wherein a carburetor throttle plate position responsive mechanism serves to control the flow of a transmission fluid to stop the rotation of the transmission output shaft in response to a fluid pressure signal indicative of a substantially zero throttle plate opening and a substantially zero vehicle speed.

A more specific object of the invention is to provide a transmission output shaft brake system including an electrical switch connected to either the accelerator pedal or to the throttle plate, a solenoid responsive to the switch operation for controlling an exhaust port to thereby control a valve arrangement for directing transmission fluid to a spring-loaded regulating valve, a governor for controlling the pressure of the transmission fluid on an end of the regulating valve to thus control the passage of the fluid from the valve arrangement through the regulating valve to a servochamber for moving a diaphragm and, in turn, an annular apply plate to engage brake discs associated with the transmission output shaft and housing.

These and other objects and advantages of the invention will be apparent when reference is made to the following description and accompanying drawings, wherein:

FIG. 1 is a fragmentary cross-sectional view of a motor vehicle transmission embodying the invention; and FIG. 2 is a fragmentary cross-sectional view taken along the plane of line 2—2 of FIG. 1, and looking in the direction of the arrows.

Referring to the drawings in greater detail, FIG. 1 illustrates a motor vehicle transmission 10 including a housing 12 and a transmission output shaft 14 extending therefrom. FIG. 1 additionally illustrates a brake cooling system 16 operating in conjunction with the transmission output shaft 14 and front wheel disc brakes, represented generally at 18, and including a brake cooler 20, and a sump 22 providing a source of brake fluid, the usual foot brake pedal 24 and its associated master cylinder 26, the latter including a source of brake fluid different from that in the sump 22, and a conduitry system for directing the necessary fluid flow throughout the cooling system 16. The conduitry system specifically includes a line 28 leading from the master cylinder 26 to a chamber 30 housing a slidably mounted member 31, spring-loaded by a spring 32. A seal 33 is mounted in the chamber 30 for slidable movement with the member 31. An elongated stem 34 extending from a by-pass valve 36, through openings 38 and 40 formed in a housing 42, and through an opening 43 into the chamber 30, abuts against the spring-loaded member 31. An exhaust port 44 is formed in the chamber 30.

The by-pass valve 36 is urged into a closed position against a seat 45 in the chamber 46 by a spring 47. Another line 48 communicates between the sump 22 and an inlet 50 leading into the chamber 46. A passage 52, including a restriction 54, communicates at all times between the inlet 50 and an outlet 56 leading from a chamber 58 located adjacent an opening 60 which is controlled by the valve 36. A line 62 leads from the outlet 56 to an inlet 64 into an annular chamber 66 formed in the transmission housing 12. A pump 68, which may be either a centrifugal-type or a vane-type, is splined for rotation on the transmission output shaft 14 and rotates in the annular chamber 66. A pump outlet 70 is formed in the transmission housing 12, communicating with a line 72 leading to the front wheel brakes 18. A line 74 communicates from the brakes 18 to the brake cooler 20, while still another line 76 communicates between the brake cooler 20 and the sump 22.

A passage 78, including a restriction 80, extends from the juncture of the pump outlet 70 and the line 72 to a chamber 82 housing a slidably mounted valve 84 which normally closes off an outlet 86 leading into a central chamber 88. A lever 90 is secured in the chamber 88 to an extension 92 of a shaft 94 which is rotatably mounted through the transmission housing 12. The lever 90 extends through a slot 96 formed in the stem 34 of the by-pass valve 36, the end thereof having a spherical shape 98 formed thereon and pivotably mounted in an opening 100 formed in a stem 102 extending from the valve 84. A plurality of spaced-apart discs or plates 104 are secured to the transmission housing 12 in the central chamber 88. An additional plurality of discs or plates 106 are alternately sandwiched between the fixed discs 104 and axially slidably mounted on a hub 108 which is secured to the transmission output shaft 14.

A strut 110 is mounted in the chamber 88, abutting against a groove 112 formed on the shaft 94 and a groove 114 formed on an annular lever member 115. The member 115 is positioned adjacent an annular apply plate 116 and includes a pair of oppositely disposed projections 117 which abut against the apply plate 116. The apply plate, in turn, is positioned adjacent the discs 104 and 106. It should be noted that the annular lever member 115 is confined between the strut 110 and the anchor pin end 138 on the one side and the annular apply plate 116 on the other end and, accordingly, may be pivoted about either of its ends to force the apply plate 116 to the left. The shaft 94 may be rotated by the manual actuation of a lever 118 (FIG. 2) secured to the shaft 94 exterior of the transmission housing 12. Seals 119 around the shaft 94 prevent leakage therepast from the transmission housing 12.

A brake-engaging system 120 operatively cooperates with the discs 104 and 106 and the annular lever member 115 and includes a cavity 121 formed in the transmission housing 12 adjacent the central chamber 88. Aligned openings 122 and 124 are formed through the wall 126 and an end cover 128. A movable wall, such as a diaphragm 130, secured at its outer edge between the wall 126 and the cover 128, divides the cavity 121 into two variable chambers 132 and 134. An anchor pin 136 extends from the diaphragm 130 and is slidably mounted in the opening 122. An adjustable stop screw 137 is mounted through the opening 124. The extended end 138 of the anchor pin 136 is positioned in an indentation 139 formed in the annular lever 115 for pivotably moving the annular lever 115 about the strut 110 in response to axial movement of the diaphragm 130, in order to move the apply plate 116 to the left to engage the discs 104 and 106.

Transmission fluid is communicated from the reservoir 140 of the transmission housing 12 via a line 142 including the usual pump 141 and regulating valve 143. The line 142 communicates with one end of a chamber 144. It may be noted at the left-hand end of FIG. 1 that the seals 145 separate the transmission fluid in the reservoir 140 from the coolant in the central chamber 88. The chamber 144 includes an exhaust port 147 and houses a valve 146 which is urged toward the line 142 inlet by a spring 148. The valve 146 includes two lands 150 and 152 and an annular recess 154 therebetween, the spring 148 abutting against the outer face of the land 152. A branchline 156, including a restriction 158, communicates between the line 142 and an exhaust opening 160 formed in a wall 162 of a housing 164, the exhaust opening 160 being larger in diameter than the restriction 158. Another branchline 166 communicates between the line 156 at a point intermediate the restriction 158 and the exhaust opening 160, and the end of the chamber 144 opposite the line 142. Another line 168 communicates between the chamber 144, intermediate inlets of the lines 142 and 166, and a port 167 leading into another chamber 170 which houses a regulating valve 172 and includes a chamber 169 at the right-hand end thereof. The regulating valve 172, including lands 174 and 176, is urged to the right in the chamber 170 by a spring 178. Transmission fluid at line pressure is communicated via the line 142 to the usual governor 184, and a line 180, including a restriction 182, communicates transmission fluid at governor pressure between the governor 184 and the chamber 169 at the right-hand end 171 of the regulating valve 172 opposing the force of the spring 178. The pressure in the line 180 and in the chamber 169, urging the regulating valve 172 to the left, is reflective of vehicle speed by virtue of the centrifugal action of the governor 184. Another line 186 communicates between the chamber 170 and the variable chamber 134 adjacent the diaphragm 130, and a port 187 at times exhausts the chamber 170.

A valve 188 is slidably mounted in the housing 164 and urged into a normally closed position against the exhaust opening 160 by a spring 190. A solenoid 192 is mounted in the housing 164 and operatively connected to the valve 188 for opening the valve 188 against the force of the spring 190 upon being energized by a switch 194. The latter may be operatively connected to the usual carburetor throttle plate 196 via the accelerator pedal 198 and/or suitable linkage 199. The switch 194 may be connected to the accelerator pedal 198 by any suitable means, such as a rod 200, and is set such that it will close and energize the solenoid 192 whenever the throttle plate 196 is at substantially a zero opening position. Suitable wiring 202 completes the circuit between the solenoid 192 and the switch 194.

OPERATION

A brake fluid in the sump or reservoir 22, which is a different fluid from the usual transmission fluid and from the usual brake fluid, is able to flow through the line 48 by virtue of the reservoir being located higher than the transmission 10. Some fluid in the line 48 flows at all times from the inlet 50 into the outlet 56 via the passage 52 including the restriction 54, in order to maintain oil rather than air in the system.

When the brake foot pedal 24 is depressed, the master cylinder 26 will cause the brake fluid in the line 28 to increase its pressure against the seal 33 and the end face of the member 31 which is slidably mounted in the chamber 30, urging it to the left in FIG. 1 against the force of the spring 32. Any fluid displaced by this movement exhausts through the outlet port 44. Leftward movement of the member 31, under the pressure of the brake fluid from the line 28 against the force of the spring 32, causes the stem 34 to move to the left, thereby lifting the bypass valve 36 off the seat 45, permitting a substantial volume of fluid from the chamber 46 to enter the chamber 58 and flow therefrom into the outlet 56 and thence to the line 62 and the inlet 64 leading to the annular chamber 66 adjacent the centrifugal- or vane-type pump 68 mounted on the transmission output shaft 14 in the transmission housing 12. The fluid will then be pumped by the pump 68 into the outlet 70 and the line 72 leading to the front wheel disc brakes 18, providing a coolant therefor. The fluid is thereafter routed to the brake cooler 20 via the line 74. The cooler 20 may be located adjacent the usual radiator (not shown), in a manner similar to the usual cooler associated with the transmission. From the cooler 20, the fluid is returned to the sump 22 via the line 76. Release of the brake foot pedal 24 will, of course, permit the spring 32 to move the member 31 to the right, thus permitting the spring 47 located to the left of the bypass valve 36 in the chamber 46 to move the by-pass valve 36 and its associated stem 34 to the right, once again closing off the opening 60, thereby cutting off the flow from the line 48 to the line 62, except through the small restriction 54.

It should be noted that the lever 90 did not move throughout the above-described operation by virtue of the slot 96 in the stem 34 being large enough to prevent contact of the lever 90 by the stem 34 as the latter moves to the left as described.

When desired, the lever 118 (FIG. 2) is manually actuated via suitable linkage (not shown) by the usual manual lever (not shown) located in the vehicle near the operator. Rotation of the lever 118 rotates the shaft 94 in a clockwise direction (FIG. 1), causing the strut 110 to move to the left in FIG. 1, forcing the annular lever member 115 and its projections 117 to the left, thereby causing the apply plate 116 to move to the left, engaging the discs 106 secured to the hub 108 and thus to the transmission output shaft 14 with the discs 104 fixed on the transmission housing 12. This, of course, prevents further rotation of the transmission output shaft 14.

Since the lever 90 is operatively connected via the extension 92 to the shaft 94 for rotation therewith, it may be noted that the lever 90 will be rotated in a clockwise direction in response to manual actuation of the lever 118 (FIG. 2). This will move the stem 102 and the associated valve 84 to the left in FIG. 1 permitting fluid to pass through the restriction 80 and the line 78 into the opening 86 and thence to the central chamber 88 surrounding the fixed and rotatable discs 104 and 106, serving as a coolant therefor until the lever 118 is manually released, at which time the valve 84 will be retracted by the lever 90, cutting off the flow into the central chamber 88. It may be understood that movement of the lever 90 will also open the valve 36 and permit coolant to flow to the front wheel brakes in the manner described above.

Insofar as the brake-engaging system 120 is concerned, the switch 194 may be operatively connected either to the usual accelerator pedal 198, such as by the rod 200, or to the carburetor throttle plate 196, such as by the pedal 198 and/or linkage 199. The switch 194 is set to be closed at approximately zero throttle opening, thereby energizing the solenoid 192 and moving the valve 188 to the right in FIG. 1 against the force of the spring 190. This opens the exhaust port 160, which is larger in diameter than the restriction 158 in the branchline 156, permitting the transmission fluid located in the right end of the chamber 144 and the branchline 166 to be discharged back to the transmission sump 140, thereby relieving the fluid pressure to the right of the valve 146. The valve 146 is then moved to the right under the force of the transmission line pressure in the line 142 on the left end of the valve 146, compressing the spring 148. Rightward movement of the valve 146 permits line pressure from the line 142 to flow into the feedline 168 leading to the regulator valve central chamber 170. So long as the vehicle is still moving, fluid pressure representative of speed will be communicated in the usual manner, under the action of centrifugal force, from the governor 184 to the line 180, through the restriction 182, and thence to the chamber 169 where it acts upon the end face 171 of the regulating valve 172.

Once the speed of the vehicle approaches zero, the governor pressure in the chamber 169 on the right end 171 of the valve 172 will have decreased sufficiently for the spring 178 to have urged the valve 172 to the right, until the left edge of the land 176 has moved past the port 167 of the feedline 168, thereby permitting the transmission fluid to flow through the resultant cracked opening from the feedline 168 into the central chamber 170 between the lands 174 and 176 and thence to the line 186 leading to the variable servochamber 134. At this point, the leftward force of the low governor pressure on the relatively large end face 171 will be further reduced as the speed is reduced and be replaced by the leftward force of this regulated pressure downstream of port 167 on the smaller differential area between the lands 174 and 176. When the pressure in the chamber 169 is reduced to zero, this regulated pressure is at its maximum value. Thus this valve supplies a gradually increasing regulated pressure for smooth brake application. The valve 172 thus functions as a regulating valve and continues to seek a balanced position to supply this regulated pressure to the line 186 during the engagement of the discs 104 and 106.

The oil in the variable servochamber 134, at the pressure regulated by valve 172, will force the servopiston or diaphragm 130 to the left (FIG. 1), thereby moving the anchor pin 136 to the left, rotating the annular lever 115 in a clock-wise direction, the strut 110 serving as a pivot point. This will move the apply plate 116 to the left, causing the engagement of the discs 106, which are secured to the transmission output shaft 14, with the fixed discs 104, thereby preventing any further rotation of the transmission output shaft 14.

It should be noted that during the operation just described no cooling oil is provided, inasmuch as it is not deemed essential since the vehicle is virtually at a standstill just prior to the application of brake discs 104 and 106.

As soon as the accelerator pedal 198 is once again depressed, the throttle plate 196 will, of course, open and the associated switch 194 will likewise open, deenergizing the solenoid 192. This will permit the spring 190 to urge the valve 188 to the left in FIG. 1, closing off the exhaust port 160. Since this, in effect, constitutes a closed end chamber, the pressure in the branchlines 156 and 166 and in the right-hand end of the chamber 144 will build up to line pressure and permit the spring 148 to move the valve 146 to the left. This will cut off the flow from the line 142 to the feedline 168. Simultaneously, the governor 184, under the action of centrifugal force, will increase the pressure of the fluid in the line 180 and the right-hand chamber 169, urging the regulating valve 172 to the left against the force of the spring 178, resulting in the land 176 blocking off communication between the feedline 168 and the central portion of the chamber 170 and opening the line 186 to the exhaust port 187. This, of course, will deplete the pressure in the servochamber 134 and thereby release the leftward pressure on the fixed and rotatable discs 104 and 106. This permits the transmission output shaft 14 to rotate and the vehicle to be accelerated in the usual manner.

It should be apparent that the invention provides and improved brake-engaging system for engaging a transmission output shaft-type brake when the throttle plate closes and the vehicle stops its forward movement, with the brake remaining engaged until such time as the accelerator pedal is once again depressed.

While but one principal embodiment of the invention has been shown and described, other modifications thereof are possible.

I claim:

1. In a motor vehicle including a transmission housing containing a source of fluid and having a transmission output shaft rotatably mounted therein, a governor for controlling the pressure of said transmission fluid in response to the speed of said motor vehicle, and a carburetor including a throttle plate, a brake-engaging system comprising a first plurality of brake discs secured to said transmission housing, a second plurality of brake discs secured to said transmission output shaft for rotation therewith, first means operatively connected to said two pluralities of brake discs for causing the engagement of said brake discs, a passage communicating between said source of transmission fluid and said first means, and second means operatively connected to said throttle plate and to said governor for controlling the flow of said transmission fluid through said passage to said first means in response to substantially zero throttle setting and a low vehicular speed for causing said first means to engage said brake discs, said second means including a regulating valve for regulating the pressure of said fluid flowing to said first means wherein the force of a low governor pressure on an end area of said regulating valve is replaced by the force of a higher pressure from the upstream portion of said passage on a differential area of said regulating valve for regulating the pressure in the downstream portion of said passage during the brake disc engagement process.

2. A brake-engaging system for a motor vehicle including a transmission housing containing a source of fluid and having a transmission output shaft rotatably mounted therein, and a carburetor including a throttle plate, said system comprising a first plurality of brake discs secured to said transmission housing, a second plurality of brake discs secured to said transmission output shaft for rotation therewith, a diaphragm movably mounted in said transmission housing, an anchor pin secured to one side of said diaphragm and extending axially therefrom, an annular lever mounted around said transmission output shaft and pivotably connected to the extended end portion of said anchor pin adjacent said two pluralities of brake discs for causing the engagement of said brake discs, a passage communicating between said source of transmission fluid and the other side of said diaphragm, a governor for controlling the pressure of said transmission fluid in response to the speed of said motor vehicle, said electromechanical means operatively connected to said throttle plate and to said governor for controlling the flow of said transmission fluid through said passage to said diaphragm in response to a substantially zero throttle setting and a low vehicular speed for causing said diaphragm to move said anchor pin, thereby pivoting said annular lever into contact with said brake discs.

3. A brake-engaging system for a motor vehicle including a transmission housing containing a source of fluid and having a transmission output shaft rotatably mounted therein, and a carburetor including a throttle plate, said system comprising an electrical switch operatively connected to said throttle plate, a first plurality of brake discs fixedly secured to said transmission housing, a second plurality of brake discs fixedly secured to said transmission output shaft, a servomechanism slidably mounted in said transmission housing, lever means pivotably connected to said servomechanism adjacent said two pluralities of brake discs for causing the engagement of said brake discs, a passage communicating between said source of transmission fluid and said servomechanism, a solenoid operatively connected to said switch, valve means operatively connected to said solenoid and to said passage for controlling the flow of said transmission fluid through said passage in response to energization of said solenoid by said switch, a governor for controlling the pressure of said transmission fluid in response to the speed of said motor vehicle, and a regulating valve operatively connected to said governor for regulating the flow of said transmission fluid between said first-mentioned valve means and said servomechanism when said governor pressure signal is indicative of a low vehicular speed and thereby causing said servomechanism to pivot said lever means into contact with said brake discs for engaging same.

4. A brake system for a motor vehicle including a transmission housing having a transmission output shaft rotatably mounted therein, said system comprising a source of fluid under pressure, a first plurality of brake discs secured to said housing, a second plurality of brake discs secured to said transmission output shaft for rotation therewith, a second shaft rotatably mounted through an opening formed in the side of said housing transverse to said output shaft, means operatively connected to said second shaft for engaging said first and second pluralities of brake discs in response to rotary movement of said second shaft, a manual brake lever secured to said second shaft exterior of said housing for rotating said second shaft, normally closed valve means operatively connected to said second shaft, means operatively connected to said second shaft and to said valve means for opening said valve means when said second plurality of brake discs is moved axially into engagement with said first plurality of brake discs in response to manual actuation of said brake lever for supplying said fluid from said source to said discs as a coolant therefor, and a carburetor including a throttle plate and a brake-engaging system operatively connected to said means for engaging said first and second pluralities of brake discs for causing the engagement thereof and for stopping the rotation of said transmission output shaft when said throttle plate is at substantially zero throttle opening and the speed of said motor vehicle is low.

5. The brake system described in claim 4, wherein said brake-engaging system includes an electrical switch operatively connected to said throttle plate, a source of transmission fluid, a servomechanism operatively connected to said engaging means, a passage communicating between said source of fluid and said servomechanism, a solenoid operatively connected to said switch, valve means adjacent said passage for controlling the flow of said transmission fluid through said passage in response to energization of said solenoid by said switch, a governor for controlling the pressure of said transmission fluid in response to the speed of said motor vehicle, and a regulating valve operatively connected to said governor for regulating the flow of said transmission fluid between said first-mentioned valve means and said servomechanism when said governor pressure signal is indicative of low vehicular speed and thereby causing said servomechanism to actuate said means for engaging said first and second pluralities of brake discs.

6. The brake system described in claim 4, and a set of disc brakes, a manual brake pedal, a pump secured to said transmission output shaft for rotation therewith, first passage means communicating between said source of fluid and said pump, second passage means communicating between said pump and said set of disc brakes, second normally-closed valve means operatively connected to said first passage means, lever means operatively connected to said second valve means and said brake pedal for opening said second valve means in response to depression of said brake pedal and thereby supplying fluid to said pump for pumping said fluid through said second passage means to said disc brakes for cooling said disc brakes, and third passage means communicating between said disc brakes and said fluid source.

* * * * *